United States Patent [19]
Vo et al.

[11] Patent Number: 5,724,656
[45] Date of Patent: Mar. 3, 1998

[54] METHOD AND APPARATUS FOR PROVIDING AN IMPROVED CALLER INTERFACE IN A FIXED CELLULAR COMMUNICATIONS SYSTEM

[75] Inventors: Kim Phuong Vo, Mount-Royal; Daniel Dufour, Blaineville, both of Canada; Håkan Olsson, Sollentuna, Sweden

[73] Assignee: Telefonaktiebolaget LM Ericsson, Stockholm, Sweden

[21] Appl. No.: 538,157

[22] Filed: Oct. 2, 1995

[51] Int. Cl.$^6$ .................................................. H04M 11/00
[52] U.S. Cl. ........................ 455/422; 455/556; 455/557
[58] Field of Search .............................. 379/58, 59, 63, 379/60, 57, 61, 201, 94; 455/33.1, 74.1, 403, 422, 426, 554, 557, 404, 556

[56] References Cited

U.S. PATENT DOCUMENTS

| | | | |
|---|---|---|---|
| 4,220,821 | 9/1980 | Lucas | 379/58 |
| 4,430,755 | 2/1984 | Nadir et al. . | |
| 4,658,096 | 4/1987 | West, Jr. et al. | 455/422 |
| 4,737,975 | 4/1988 | Shafer | 455/557 |
| 4,748,655 | 5/1988 | Thrower et al. | 379/60 |
| 4,775,997 | 10/1988 | West, Jr. et al. | 455/554 |
| 4,922,517 | 5/1990 | West, Jr. et al. | 455/557 |
| 4,959,851 | 9/1990 | Tobolski | 379/59 |
| 5,117,450 | 5/1992 | Joglekar | 379/59 |
| 5,127,042 | 6/1992 | Gillig et al. . | |
| 5,309,502 | 5/1994 | Hirai . | |
| 5,367,558 | 11/1994 | Gillig et al. . | |
| 5,410,728 | 4/1995 | Bertiger | 379/60 |
| 5,448,622 | 9/1995 | Huttunen | 379/58 |
| 5,469,496 | 11/1995 | Emery et al. | 379/58 |
| 5,475,735 | 12/1995 | Williams | 379/59 |
| 5,535,260 | 7/1996 | Zicker | 379/58 |
| 5,594,782 | 1/1997 | Zicker | 379/59 |

FOREIGN PATENT DOCUMENTS

| | | |
|---|---|---|
| 0 505 106 A2 | 3/1992 | European Pat. Off. . |
| 4240249 | 11/1992 | Germany . |
| 9524103 | 9/1995 | WIPO . |
| 9613948 | 5/1996 | WIPO . |

OTHER PUBLICATIONS

Homayoun Hashemi, Kiomars Anvari, and Mahmoud Tabiani, "*Application of Cellular Radio to Telecommunication, Expanion in Developing Countries*", Orlando Globecom '92, IEEE Global Telecommunications Conference, publ. Jun. 12, 1992, vol. 1, Sessions 1–18, pp. 1–648; vol. 2, Sessions 19–36B, pp. 649–1254; vol. 3, Sessions 37–54, pp. 1255–1920.

Ericsson Radio Systems AB, "The Phone Call Millions of People are Waiting For", 1995.

*Primary Examiner*—Dwayne Bost
*Assistant Examiner*—Brian L. Johnson
*Attorney, Agent, or Firm*—Jenkens & Gilchrist, P.C.

[57] ABSTRACT

In a fixed cellular telephone system, an improved caller interface is provided wherein the taking of a standard wireline telephone set off-hook triggers the establishment of a voice path between the telephone set and the cellular system switch. A dial tone is then applied by the cellular system to the voice path and a caller enters the digits of the telephone number of the party to which the call is directed. The caller dialed digits are transmitted over the voice path to the cellular system switch where they are processed to complete the call connection to the called party. The dialed digits are further analyzed on a one-by-one basis to determine whether improper or unauthorized digits or combinations of digits have been entered by the caller. The caller interface provided by the fixed cellular system of the present invention accordingly operates in a substantially identical manner to that experienced with a conventional wire-based telephone system and in an improved manner over that provided in a conventional cellular system.

13 Claims, 5 Drawing Sheets

METHOD AND APPARATUS FOR PROVIDING AN IMPROVED CALLER INTERFACE IN A FIXED CELLULAR COMMUNICATIONS SYSTEM

BACKGROUND OF THE INVENTION

1. Technical Field of the Invention

The present invention relates to cellular telephone systems and, in particular, to a fixed cellular communications system.

2. Description of Related Art

Most people who already have telephone service take their telephone service for granted. They do not realize that in many locations telephone service is a limited resource, and that service providers are often hard pressed to offer that service to all who desire it. Wire-based telephone service providers simply cannot keep up with the recent surge in demand for telephone service. While a large portion of this demand can be traced to the increased use of facsimile machines (which each may require a separate telephone number), an equally significant source of demand can be traced to the increased numbers of people who now want and can afford telephone service. Many times, the increases in population and accompanying increases in demand for telephone service occur in areas where the existing wire-based telephone system infrastructure is either inadequate to handle the increased demand or is completely nonexistent. In such cases, people must wait for the service provider to take the steps needed to establish the required telephone system and catch-up with the demand. Waits as long as several months for a new telephone number, and several years for the installation of wire-based telephone systems having adequate capacity, are not uncommon in heavily populated cities or remote locations.

The planning costs involved in expanding existing or initiating new wire-based telephone systems are enormous when you consider the need for both the acquisition of rights of way and the renovation or construction of the service providing infrastructure (comprising, for example, the switching networks and the laying or stringing of telephone cable). However, before making these expenditures, wire-based telephone service providers must know (or be able to accurately project) exactly where their customers will be located, how many customers will be there, and when they are going to arrive and need the service. It is often the case that service providers act in a reactionary rather than proactive manner with respect to subscriber demand, and are accordingly not prepared to meet the increases in demand in a timely fashion. This failure is caused primarily by the significant time delay experienced from the point of approving the provision of a wire-based telephone system and its actual installation and placement into operation. These delays have caused telephone service providers to re-think the use of conventional wire-based telephone systems when addressing pending needs for telephone service initiation or expansion.

Cellular telephone systems provide an attractive alternative to conventional wire-based telephone systems, especially in connection with the provision of new or expanded telephone service in heavily populated or remote areas where significant increases in demand are or have been encountered. The expense, aggravation and time involved in acquiring rights of way and establishing the infrastructure to provide telephone service are obviated or substantially reduced with the installation and use of a cellular telephone system. However, the cost to the subscriber on a monthly or per call basis often drastically exceeds the cost for similar activities incurred with respect to wire-based telephone systems. Furthermore, the mobility advantage of cellular telephone systems, which is accounted for in the increased subscriber cost of the service, is often a feature that many telephone service users do not want to pay for or necessarily need.

Accordingly, efforts have been made to couple cellular systems with conventional analog telephones and provide a hybrid telephone system wherein telephone sets are fixed at certain locations as in a wire-based system but instead access the telephone network using radio frequency communications in a cellular environment. Such systems, conventionally referred to as fixed cellular systems, interface a conventional analog telephone set, like that used in wire-based telephone systems, with a radio frequency transceiver, like that used in a mobile telephone, operating within a cellular telephone system. The primary advantages of fixed cellular systems are the elimination of the costs and hassles of acquiring rights of way and laying or stringing telephone cables, and the ease and swiftness with which the system may be installed and made operational. The availability of a fixed cellular system thus offers service providers a tool for quickly reacting to increases in demand at a reasonable provider and subscriber expense.

In spite of the fact that the subscriber's communication device (telephone set) looks like a conventional analog wire-based telephone set, in a fixed cellular system the telephone set unfortunately operates like a cellular mobile telephone, and thus suffers from the known caller interface disadvantages and inconveniences experienced with cellular service. For example, when a call is to be initiated in a fixed cellular system, the phone number must be first completely dialed into the telephone set through the keypad and then sent to the cellular system for processing. No instantaneous feedback is provided to the caller during the dialing operation concerning the propriety of the entered numbers. The transmission of the dialed number over the cellular network is made only after the activation by the caller of a send button on the keypad. The caller must then wait while the cellular network side of the system selects the voice channel to carry the conversation and completes the call to the called party. The fixed cellular system caller interface accordingly and undesirably operates more slowly relative to, and in a manner completely foreign to the manner of operation experienced in, a conventional wire-based telephone system.

Efforts have been made to have the fixed cellular system mimic operation of the wire-based telephone system with respect to some aspects of the caller interface. For example, it is known to include functionality for simulating at the cellular system interface the dial tone and reorder tones heard on conventional wire-based systems before and during the caller dialing operation. Also, functionality has been provided in fixed cellular systems for automatically generating the send command at the cellular system interface following completion of caller entry of a telephone number. With these features, the analog telephone set connected to a fixed cellular system operates more like a conventional wire-based telephone set than a cellular mobile station. However, improvements in this caller interface are still needed with respect to the speed with which the connection to the called party is established. Furthermore, there would be an advantage if the caller interface also functioned to monitor the propriety of the caller dialed numbers during the dialing operation.

SUMMARY OF THE INVENTION

A fixed cellular network in accordance with the present invention includes a conventional standard telephone set interfaced with a cellular telephone network through a fixed cellular terminal over a radio frequency air interface. The cellular telephone network includes a mobile switching center and at least one base station operating in radio frequency communication with the fixed cellular terminal. When the standard telephone set is taken off-hook by the caller to initiate a call, this event is detected by the fixed cellular terminal and a signal indicative of the off-hook condition is sent to the mobile switching center over a signaling channel of the cellular radio frequency air interface. Responsive to the receipt of the off-hook signal, the mobile switching center selects a voice channel of the radio frequency air interface to carry the call and a voice path including the selected voice channel is established between the mobile switching center and the standard telephone set via the fixed cellular terminal. A dial tone is then applied to the voice path, and in response thereto the caller enters the digits of the telephone number for the party to be called. The dialed digits of the telephone number are transmitted one-by-one over the voice channel to the mobile switching center for analysis in completing the call connection to the dialed party. One-by-one analysis of the dialed digits of the telephone number is further made to determine whether improper or unauthorized digits or combinations of digits have been entered by the caller or excessive time delays during digit entry have been experienced. The caller interface in the fixed cellular system accordingly operates in a substantially identical manner to that experienced with a conventional wire-based telephone system.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
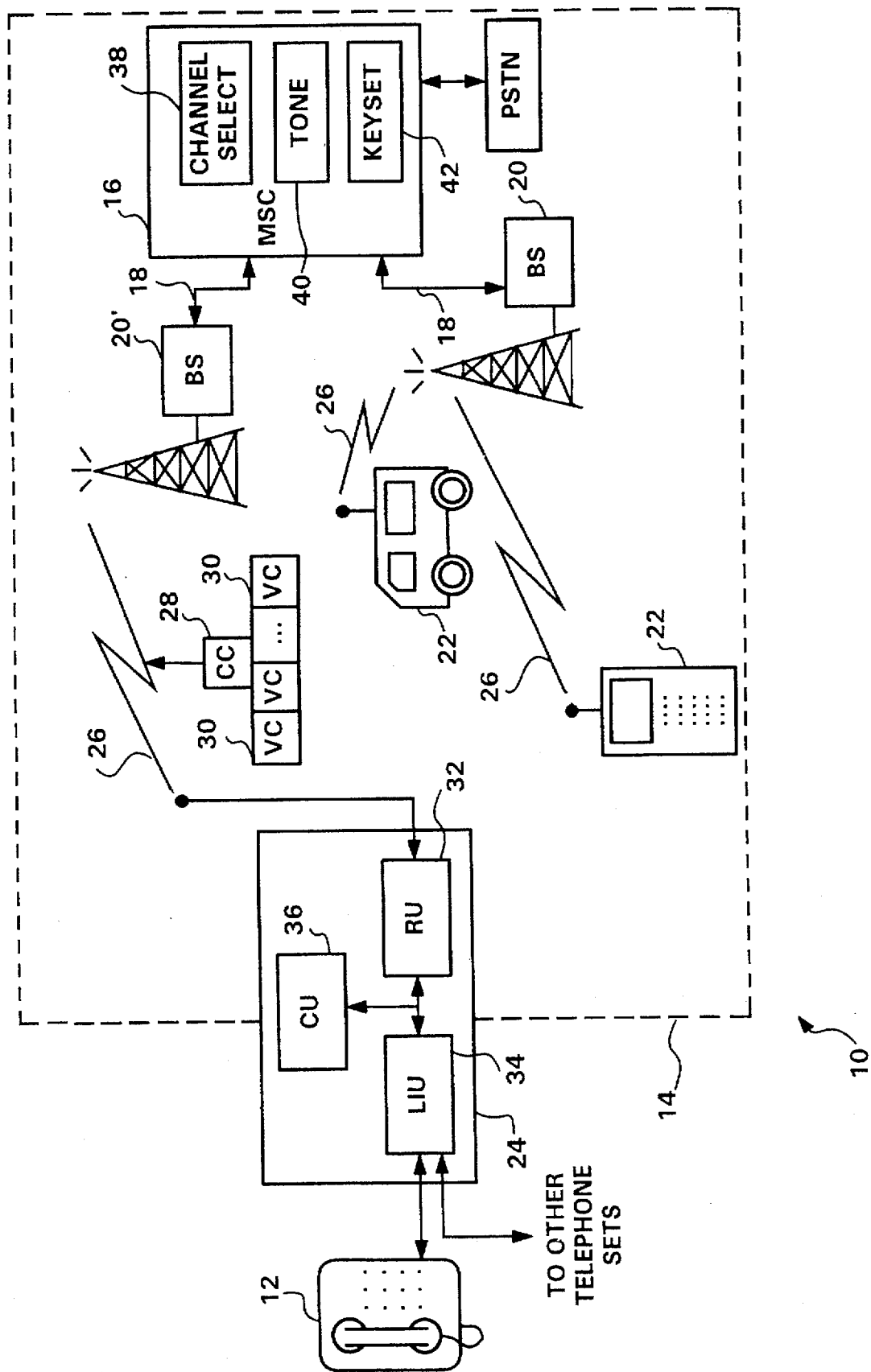
FIG. 1 is a block diagram of a fixed cellular telephone system.

Reference is now made to FIG. 1 wherein there is shown a block diagram of a fixed cellular telephone system 10 in accordance with the present invention wherein a standard telephone set 12 of the DTMF tone dial variety is connected for operation to a cellular telephone network 14. The cellular telephone network 14 comprises a mobile switching center (MSC) 16 connected by communications links 18 to a plurality of base stations (BS) 20. The connection between the standard telephone set 12 and the cellular telephone network 14 is made through a fixed cellular terminal 24 operating to establish radio frequency communications links with a proximately located base station 20'.

The radio frequency communications links established between the base stations 20 and any cellular mobile stations 22, and between the base station 20' and the fixed cellular terminal 24 are effectuated over an air interface 26 comprising at least one control channel (CC) 28 and a plurality of voice channels (VC) 30 per base station. The control channels 28 comprise bi-directional communications channels for carrying command and control signals between the base stations 20 and the mobile stations 22, and between the base station 20' and the fixed cellular terminal 24. The voice channels 30, on the other hand, comprise bi-directional communications channels for carrying voice communications between the base stations 20 and the mobile stations 22, and between the base station 20' and the fixed cellular terminal 24. Any type of cellular network air interface 26 that provides for both control and voice channels 28 and 30, respectively, may be utilized by the cellular telephone network 14, including those air interfaces specified for use in the well known AMPS, D-AMPS and GSM cellular telephone systems. The control channels or voice channels in the air interface 26 may therefore comprise either or both a certain radio frequency carrier in an analog cellular telephone system and/or a certain time slot provided within a carrier in a digital cellular telephone system, and the fixed cellular terminal may operate in either or both an analog or digital mode, respectively.

The fixed cellular terminal 24 operates as an interface between one or more standard telephone sets 12 and the cellular network 14. When operable as a multi-line terminal, the fixed cellular terminal 24 functions like a private branch exchange (PBX) to allow a plurality of subscriber telephone sets at one general location (for example, a business or a small town) to be provided with fixed cellular telephone service. As a single-line terminal, on the other hand, the fixed cellular terminal 24 provides a connection for a single subscriber telephone set at one given location (for example, a house). The fixed cellular terminal 24 may accordingly comprise either the Single-line or Multi-line Terminal manufactured by Ericsson for the CMS 8800 AMPS/D-AMPS Fixed Cellular telephone system configured in accordance with the present invention to provide an improved caller interface as will be described.

The fixed cellular terminal 24 comprises a radio unit (RU) 32, a line interface unit (LIU) 34 and a control unit (CU) 36. The radio unit 32 provides all the radio frequency communications functionality typically found in a mobile station 22 for a cellular telephone system. Thus, the radio unit 32 includes a tunable radio frequency transceiver device for accessing the radio frequency carriers (and the digital cellular system TDMA or CDMA time slots therein if applicable) for the control channels 28 and voice channels 30 provided within the air interface 26. The line interface unit 34 provides the functionality for interfacing the one or more connected standard telephone sets 12 to the radio unit 32. The control unit 36 manages the operation of the radio unit 32 and the line interface unit 34 to provide the signal conversions required to establish and terminate calls to and from the line interface unit 34 through the cellular network 14. The control unit 36 further manages all the necessary information required for establishing and authenticating calls over the cellular network 14.

Figure 2:
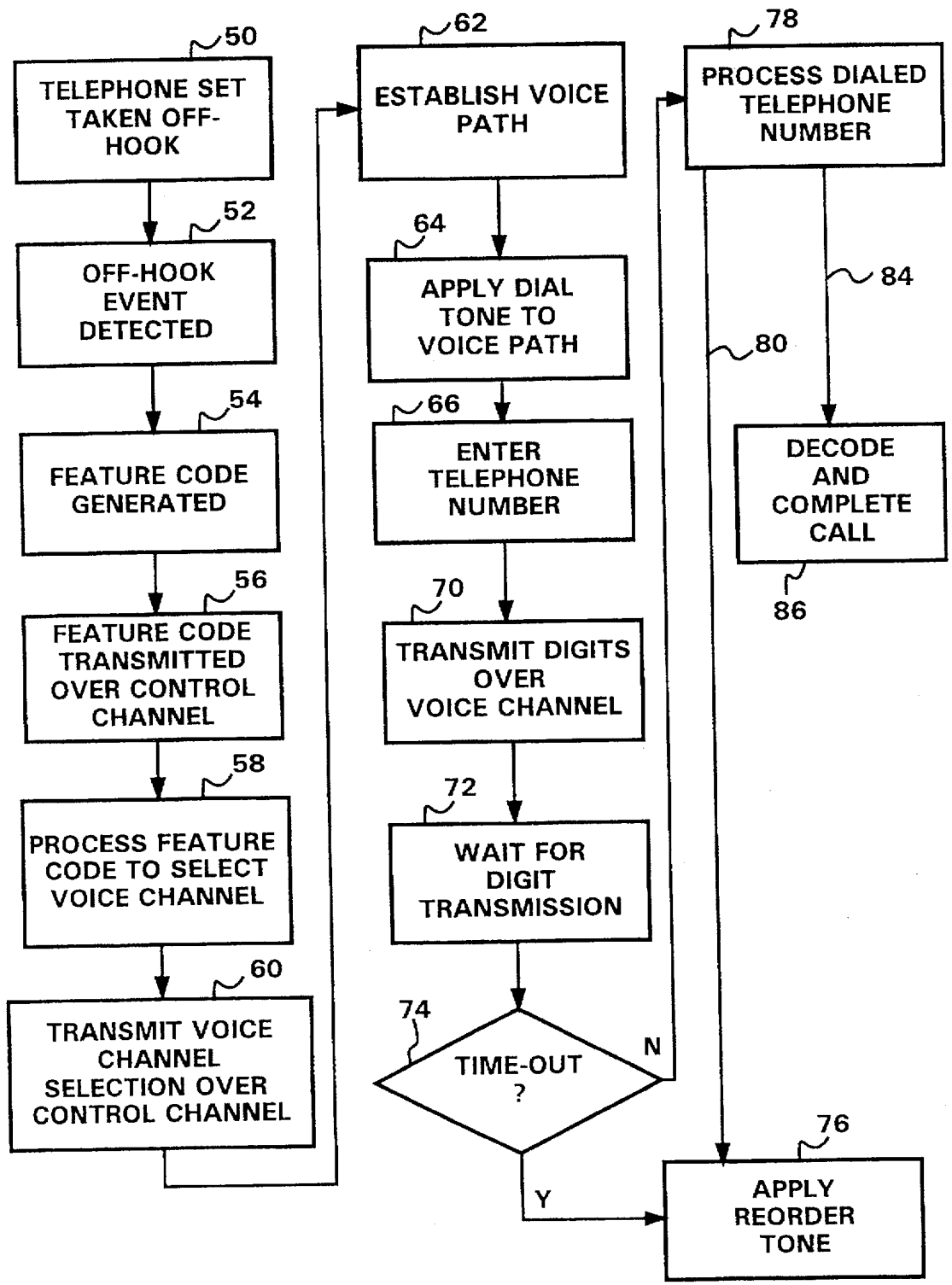
FIG. 2 is a flow diagram illustrating a method of operation for the fixed cellular telephone system of the present invention during call set-up.

Reference is now also made to FIG. 2 wherein there is shown a flow diagram illustrating a method of operation for the fixed cellular telephone system 10 of the present invention to provide an improved caller interface during call set-up. At step 50, one of the standard telephone sets 12 is taken off-hook by a caller to initiate a call. This off-hook event is detected by the line interface unit 34 of the fixed cellular terminal 24 in step 52. Responsive to the detection of the off-hook event, in step 54 the fixed cellular terminal 24 generates a special feature code indicative of the off-hook condition of the telephone set 12. The generated feature code is then transmitted in step 56 to the mobile switching center 16 over the air interface 26 using one of the control channels 28.

At the mobile switching center 16, the received feature code is processed by a channel selection unit 38 and a voice channel 30 of the air interface 26 is selected in step 58 to carry the call. A signal identifying the selected voice channel 30 is then transmitted in step 60 back over the control channel 28 of the air interface 26 for delivery to the fixed cellular terminal 24. Responsive thereto, a connection is made by the fixed cellular terminal 24 in step 62 between the voice channel 30 of the air interface 26 selected by the mobile switching center 16 and the off-hook telephone set 12 to thus establish a voice path connection (comprising in part the selected voice channel 30) between the telephone set 12 and the mobile switching center 16. At or about the same time that the voice path is established, the mobile switching center 16 generates and applies a dial tone to the voice path (step 64) using a tone/message generator unit 40. In response to presentation of the dial tone to the caller at the off-hook telephone set 12, the caller may then enter, through the key pad of the off-hook telephone set, the telephone number of party to which the call is being made (step 66). The DTMF tones for the digits of the telephone number entered by the caller are then transmitted over the voice path via the selected voice channel 30 to the mobile switching center 16 (step 70) for detection by a key set code reception unit 42 and further processing.

Following the application of the dial tone to the voice path (step 64), the mobile switching center waits in step 72 for the receipt over the voice channel 30 of the DTMF tones corresponding to the digits of the telephone number dialed by the caller. If a time-out expires either before receipt of a first DTMF tone, or between receipt of successive DTMF tones, as determined in decision step 74, the mobile switching center 16 applies a reorder (or congestion or alert) tone or voice message, as appropriate, to the voice path (step 76) for presentation to the caller through the telephone set 12. The DTMF dialing tones transmitted from the telephone set 12 over the voice path and received by the mobile switching center 16 are processed in step 78 on a one-by-one basis. This processing operation identifies whether the number being dialed is an improper or unauthorized number (path 80) and, if so, the mobile switching center 16 signals the caller by applying a reorder (or congestion or alert) tone or voice message, as appropriate, to the voice path (step 76) using the tone/message generation unit 40. The mobile switching center 16 further processes (path 84) the transmitted dialing tones to decode the dialed telephone number and complete the call to the called party in step 86.

Figure 3:
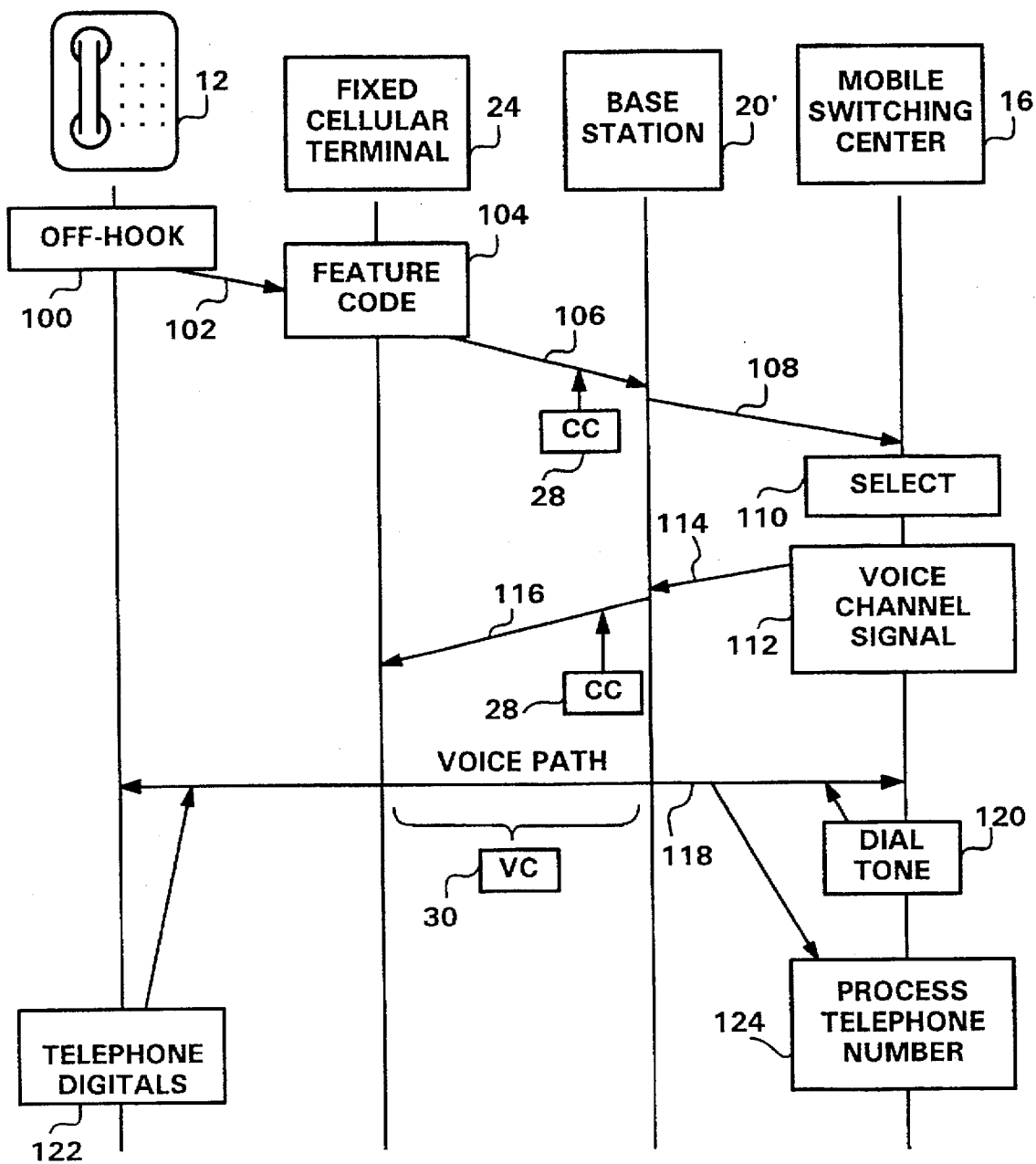
FIG. 3 is a ping-pong diagram illustrating the actions taken by, signals transmitted between, and connections made between the components of the fixed cellular system in accordance with the method of FIG. 2.

Reference is now made to FIG. 3 wherein there is shown a ping-pong diagram illustrating the interactive operation of the components of the fixed cellular system 10 in accordance with the method of FIG. 2. When the telephone set 12 goes off-hook 100 to initiate a call, a hook event 102 is detected by the fixed cellular terminal 24. In response thereto, a feature code 104 is generated by the fixed cellular terminal 24 and transmitted 106 over the control channel 28 of the air interface 26 to the base station 20' of the cellular network 14. The transmitted feature code 104 is relayed 108 by the base station 20' to the mobile switching center 16. Responsive to receipt of the feature code 104, the mobile switching center 16 selects 110 a voice channel 30 of the air interface to carry the call and generates a signal 112, identifying the selected voice channel, for transmission 114 and 116 back to the fixed cellular terminal 24 over the control channel 28 and via the base station 20'. A voice path 118, comprising in part the selected voice channel 30, is thus established between the mobile switching center 16 and the off-hook telephone set 12 through the fixed cellular terminal 24 and base station 20' of the cellular network 14. The mobile switching center 16 then applies a dial tone 120 to the voice path 118 and waits for caller identification of the telephone number for the party to be called. Responsive to the applied dial tone 120, the caller enters the digits 122 of the telephone number using the keypad of the off-hook telephone set 12. This caller action generates DTMF tones corresponding to the entered digits 122 of the telephone number, with the generated tones being transmitted over the voice path 118 (including the selected voice channel 30) to the mobile switching center 16 for analysis. At the mobile switching center 16, the received tones are processed 124 on a one-by-one basis to identify improper or unauthorized digits or combinations of digits, in response to which the caller is signaled of same by the generation and application of a reorder tone (or voice message) to the voice path 118. The received tones are also processed 124 to decode the dialed telephone number and complete the call to the called party.

Figure 4:
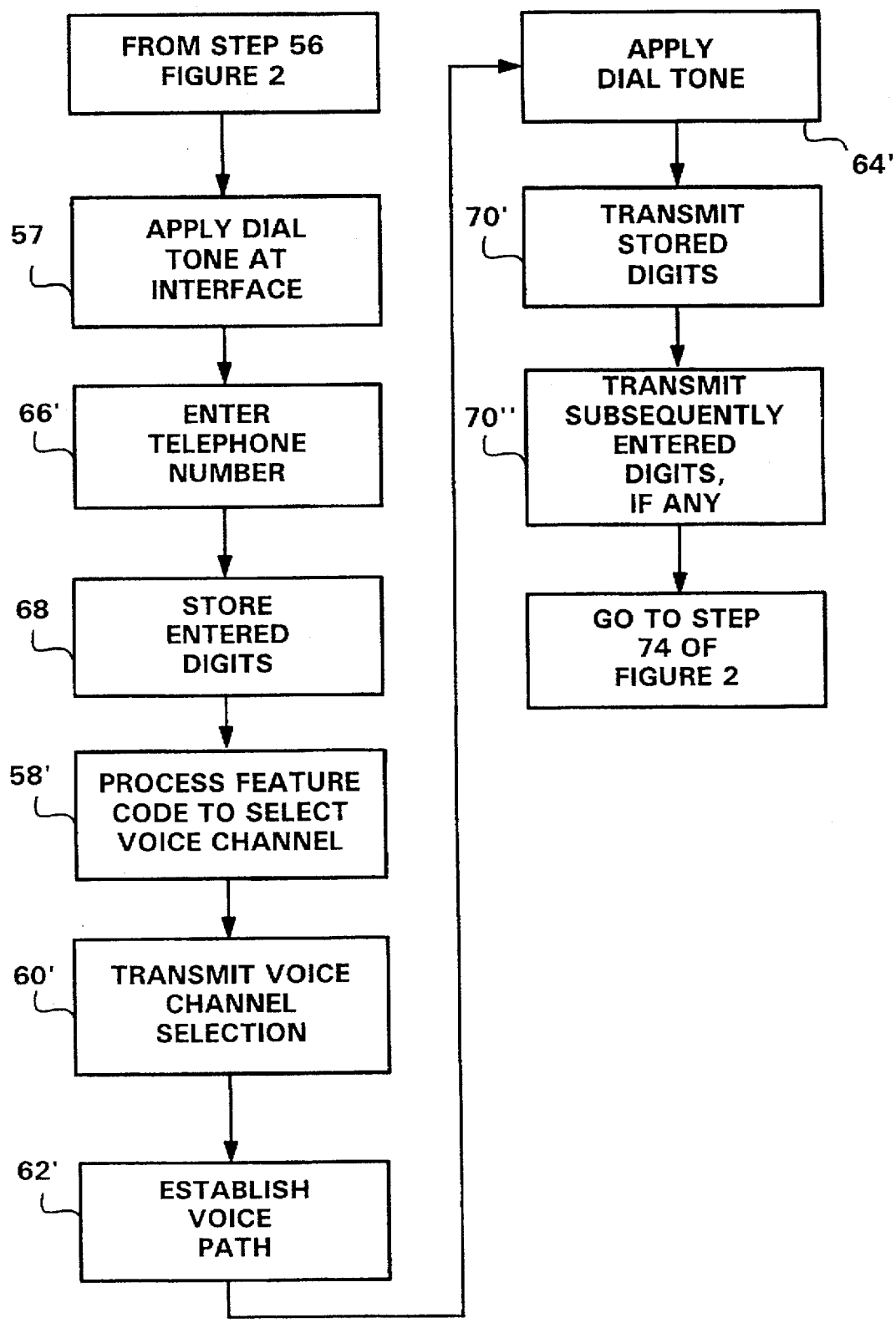
FIG. 4 is a flow diagram illustrating an alternative method of operation for the fixed cellular telephone system of the present invention.

There are likely to be times when the selection of the voice channel 30 by the mobile switching center in step 58 and the establishment of the voice path in step 62 of FIG. 2 are delayed, thus preventing the caller from receiving the mobile switching center dial tone and immediately being able to dial the number after taking the telephone set 12 off-hook. In FIG. 4, there is shown a flow diagram illustrating an alternative method of operation for the fixed cellular telephone system 10 of the present invention to address this problem by providing an alternate dial tone and allowing immediate caller dialing even though the voice path from the mobile switching center to the telephone set has not yet been established. Rather than have the dial tone be generated by the mobile switching center 16 and applied to the voice path (as in FIG. 2), the dial tone is instead generated on an interim basis by the line interface unit 34 of the fixed cellular terminal 24 in step 57 and applied to the connection made with the off-hook telephone set 12. The caller may then enter, through the key pad of the off-hook telephone set 12, the number of party to which the call is being made (step 66'). The DTMF tones for the digits of the telephone number entered by the caller are detected by the line interface unit 34 of the fixed cellular terminal 24 and the corresponding digits are stored in a memory (step 68). The fixed cellular terminal 24 does not perform any one-by-one digit propriety analysis on the digits of the telephone number entered by the caller. When the signal over the control channel 28 of the air interface 26 from the mobile switching center 16 is received indicative of the selection of the voice channel 30 (steps 58' and 60'), and the voice path is established (step 62'), a dial tone is then applied to the voice path (step 64'). Responsive thereto, DTMF tones corresponding to the previously received and stored digits of the dialed telephone number are generated by the fixed cellular terminal 24 and transmitted over the voice path to the mobile switching center 16. If the voice path is established (step 62') prior to caller completion of the dialing operation (step 66'), the previously stored digits of the partially entered telephone number are immediately transmitted by the fixed cellular terminal 24 (step 70') to the mobile switching center over the voice path, and any subsequently entered digits are transmitted over the voice path (step 70") and checked for time out in accordance with step 74 of FIG. 2 and processed in accordance with step 78 of FIG. 2.

Figure 5:
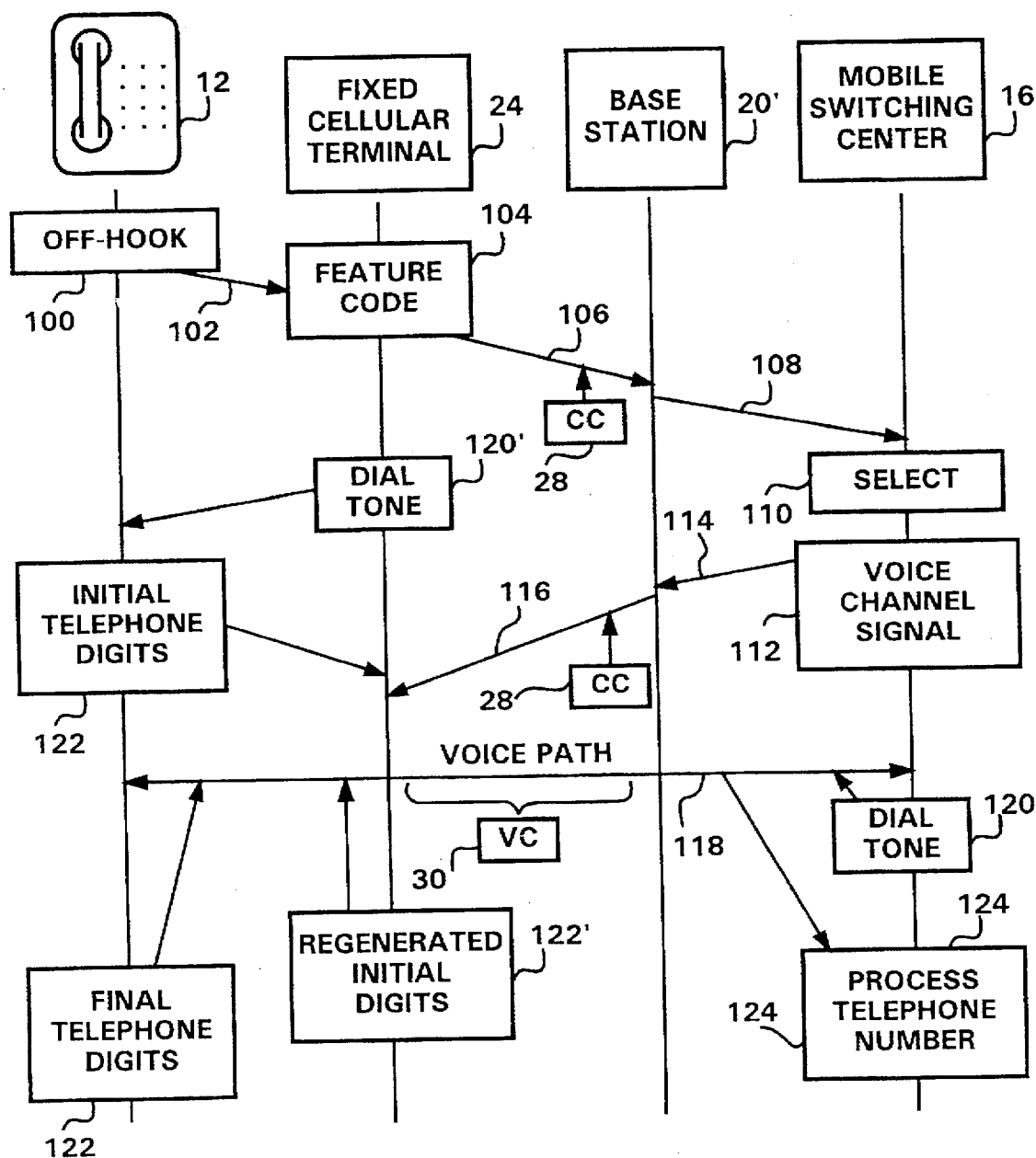
FIG. 5 is a ping-pong diagram illustrating the actions taken by, signals transmitted between, and connections made between the components of the fixed cellular system in accordance with the method of FIG. 4.

Reference is now made to FIG. 5 wherein there is shown a ping-pong diagram illustrating the interactive operation of the components of the fixed cellular system 10 in accordance with the method of FIG. 4. When the telephone set 12 goes off-hook 100 to initiate a call, a hook event 102 is detected by the fixed cellular terminal 24. In response thereto, a feature code 104 is generated by the fixed cellular terminal 24 and transmitted 106 over the control channel 28 of the air interface 26 to the base station 20' of the cellular network 14. The transmitted feature code 104 is relayed 108 by the base station 20' to the mobile switching center 16. Responsive to receipt of the feature code 104, the mobile switching center 16 selects 110 a voice channel 30 of the air interface to carry the call. When the voice channel selection process and establishment of the voice path take an unusually long amount of time, and potentially interferes with the immediate entry of the digits of the telephone number of the party to be called, the fixed cellular terminal 24 operates to apply a dial tone 120' and then receive the DTMF tones for the digits 122 dialed by the caller identifying the party to be called. The tones are detected by the line interface unit and processed to identify and store the corresponding caller dialed digits. Once the voice channel 30 is selected 110, the mobile switching center 16 generates a signal 112 for transmission 114 and 116 back to the fixed cellular terminal 24 over the control channel 28 using the base station 20'. A voice path 118, comprising in part the selected voice channel 30, is thus established between the mobile switching center 16 and the off-hook telephone set 12 through the fixed cellular terminal 24 and base station 20'. The mobile switching center 16 then applies a dial tone 120 to the voice path 118 and waits for the reception of the DTMF tones identifying the party to be called. Responsive to the applied dial tone 120, DTMF tones corresponding to any previously stored digits for the dialed telephone number are generated 122' by the terminal 24 and transmitted over the voice path 118 to the mobile switching center. If the caller has not finished dialing the telephone number (as shown in FIG. 5), the caller then completes entry of the digits 122 of the telephone number of the party to be called using the keypad of the off-hook telephone set 12, with the generated tones transmitted over the voice path 118 to the mobile switching center 16 for analysis. At the mobile switching center 16, the received tones are processed 124 on a one-by-one basis to identify improper or unauthorized digits or combinations of digits and to decode the telephone number and complete the call.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a fixed cellular system, a method for call set-up comprising the steps of:
    detecting an off-hook event for a standard telephone set;
    transmitting a signal indicative of the detected off-hook event over a control channel of a cellular air interface;
    applying a first dial tone to the standard telephone set;
    receiving from the standard telephone set digit signals indicative of a telephone number of a called party in response to the first dial tone;
    storing the telephone number;
    responsive to cellular telephone system receipt of the off-hook event signal, selecting a voice channel of the cellular air interface to carry the call;
    establishing a voice path connection between the cellular telephone system and the telephone set, the voice path comprising in part the selected voice channel;
    applying a second dial tone to the voice path connection;
    transmitting over the established voice path digit signals indicative of the stored telephone number in response to the second dial tone; and
    processing of the voice path transmitted digit signals by the cellular telephone system to complete the call to the called party.

2. The method of claim 1 wherein the off-hook event signal comprises a cellular telephone service feature code requesting selection of a voice channel.

3. The method of claim 1 wherein the digit signals comprise DTMF tones.

4. The method of claim 1 wherein the step of processing comprises the step of processing the transmitted digit signals to 1 identify improper or unauthorized digits or combinations of digits in the telephone number.

5. The method of claim 1 wherein the step of processing comprises the step of processing the transmitted digit signals to decode the telephone number of the called party and complete the call.

6. A fixed cellular telephone system, comprising:
    a standard telephone set;
    a fixed cellular terminal electrically connected to the telephone set and including:
        means for detecting an off-hook event for the telephone set at the initiation of a call;
        means responsive to the detected off-hook event for transmitting an event signal over a control channel of a cellular radio frequency air interface;
        means for generating a first dial tone for transmission to the standard telephone set;
        means for receiving and storing telephone number digits entered into the standard telephone set;
        means for retrieving the stored telephone number digits in response to receipt of a second dial tone and for transmitting the retrieved telephone number digits over a traffic channel of the cellular radio frequency air interface; and
    a cellular telephone system including means responsive to receipt of the transmitted event signal for selecting the voice channel of the cellular radio frequency air interface to carry the call, the selected voice channel comprising a part of a voice path connection for the call made between the cellular telephone system and the off-hook telephone set via the fixed cellular terminal, the cellular telephone system further including means for applying the second dial tone to the voice path connection and receiving the retrieved telephone number digits transmitted by the fixed cellular terminal over the voice channel of the air interface.

7. The fixed cellular system of claim 6 wherein the cellular telephone system further includes means responsive to receipt of the transmitted telephone number digits for completing the call to a called party.

8. The fixed cellular system of claim 7 wherein the cellular telephone system further includes means for analyzing the transmitted telephone number digits to identify instances of improper or unauthorized digits or combinations of digits.

9. The fixed cellular system of claim 6 wherein the event signal comprises a cellular telephone service feature code requesting selection of a voice channel.

10. A fixed cellular terminal for use in a fixed cellular communications system and for electrical connection to a standard telephone set, comprising:

means for detecting an off-hook event concerning the telephone set at the initiation of a call;

means responsive to the detected off-hook event for transmitting an event signal over a control channel of a cellular radio frequency air interface to a cellular telephone system;

means for applying a first dial tone to the standard telephone set;

means for receiving telephone number digits entered through the standard telephone set in response to the first dial tone;

means for storing the received telephone number digits; and means responsive to both the establishment of a call voice path connection through the fixed cellular terminal between the off-hook analog telephone set and the cellular telephone system, the voice path connection comprising in part a voice channel of the cellular radio frequency air interface, and the application of a second dial tone to the voice path connection by the cellular telephone system, for retrieving the stored telephone number digits for transmission over the voice path connection to the cellular telephone system.

11. A method for setting-up a call in a fixed cellular telephone system, comprising the steps of:

transmitting a signal over a control channel of a cellular telephone system radio frequency air interface indicative of a standard telephone set off-hook event;

offering a first dial tone to the standard telephone set;

receiving telephone number digits entered into the standard telephone set;

storing the received telephone number digits;

selecting a voice channel of the cellular telephone system radio frequency air interface to carry the call;

establishing a voice path connection for the call, the voice path connection extending between the off-hook telephone set and the cellular system and including as a part thereof the selected voice channel of the cellular telephone system radio frequency air interface;

applying a second dial tone to the voice path connection; and retrieving the stored telephone number digits for transmission over the voice path connection to the cellular system in response to the second dial tone.

12. The method of claim 11 further including the step of processing the transmitted telephone number digits to complete connection of the call to the telephone number.

13. The method of claim 11 further including the step of processing the transmitted telephone number digits to identify instances of improper or unauthorized digits or combinations of digits in the telephone number.

* * * * *